US012149908B2

(12) United States Patent
Lv et al.

(10) Patent No.: US 12,149,908 B2
(45) Date of Patent: Nov. 19, 2024

(54) SOUND DEVICE

(71) Applicant: AAC Microtech (Changzhou) Co., Ltd., Changzhou (CN)

(72) Inventors: Xuedong Lv, Shenzhen (CN); Xiaoqiong Feng, Shenzhen (CN); Kun Yang, Shenzhen (CN); Zhen Huang, Shenzhen (CN); Yi Shao, Shenzhen (CN)

(73) Assignee: AAC Microtech (Changzhou) Co., Ltd., Changzhou (CN)

( * ) Notice: Subject to any disclaimer, the term of this patent is extended or adjusted under 35 U.S.C. 154(b) by 216 days.

(21) Appl. No.: 18/073,584

(22) Filed: Dec. 2, 2022

(65) Prior Publication Data

US 2024/0073615 A1 Feb. 29, 2024

Related U.S. Application Data

(63) Continuation of application No. PCT/CN2022/114674, filed on Aug. 25, 2022.

(51) Int. Cl.

| | |
|---|---|
| ***H04R 9/06*** | (2006.01) |
| ***H04R 1/24*** | (2006.01) |
| ***H04R 9/02*** | (2006.01) |
| ***H04R 9/04*** | (2006.01) |

(52) U.S. Cl.

CPC ............... *H04R 9/025* (2013.01); *H04R 1/24* (2013.01); *H04R 9/045* (2013.01); *H04R 9/046* (2013.01); *H04R 9/06* (2013.01); *H04R 9/063* (2013.01); *H04R 2209/026* (2013.01); *H04R 2400/11* (2013.01)

(58) Field of Classification Search

CPC . H04R 1/24; H04R 9/02; H04R 9/025; H04R 9/045; H04R 9/046; H04R 9/06; H04R 9/063; H04R 2209/026; H04R 2400/11

See application file for complete search history.

(56) References Cited

U.S. PATENT DOCUMENTS

| | | | | |
|---|---|---|---|---|
| 10,631,096 B1 * | 4/2020 | Garcia Selva | ........... | H04R 9/06 |
| 2016/0021441 A1 * | 1/2016 | Shao | ........................ | H04R 1/24 381/412 |
| 2023/0156383 A1 * | 5/2023 | Xiao | ...................... | H04R 9/027 381/398 |

* cited by examiner

*Primary Examiner* — Huyen D Le

(74) *Attorney, Agent, or Firm* — W&G Law Group

(57) ABSTRACT

The present disclosure discloses a sound device includes a frame, a magnet system, and a first vibration system and a second vibration system arranged on two sides of a magnet system. The magnet system includes a first central yoke, a central magnet mounted on the first central yoke, a side yoke surrounding the central magnet and fixed to the frame, and a connection portion connecting the first central yoke and the side yoke. The side yoke includes a first side yoke fixed to the frame and a second side yoke bending and extending from an edge of the first side yoke towards the central magnet; the connection portion connects the first central yoke and the second side yoke. The sound device in the present disclosure has higher magnetic ability and miniaturization ability.

10 Claims, 3 Drawing Sheets

100

SOUND DEVICE

FIELD OF THE PRESENT DISCLOSURE

The present disclosure relates to electro-acoustic transducers, especially relates to a sound device applied in mobile device.

DESCRIPTION OF RELATED ART

With the development of electronic technologies, users have increasingly demands for acoustic quality for portable mobile terminals, in which a sound device is generally used for the playback of audio signal. At the same time, sound device needs to comply with the thinner and lighter trend of the portable mobile terminals.

In related art, in order to improve the acoustic performance of a sound device, an approach has been developed which involves a sound device which includes two vibration systems arranged opposite to each other. The said sound device includes one magnet system configured to drive the two vibration systems to vibrate to generate sound. Generally, the magnet system includes a main yoke, a main magnet fixed to the main yoke, and a side magnet surrounding the main magnet to form a magnetic gap. However, the main magnet and the side magnet may occupy excessive inner space of the sound device thus increasing its volume and affects the ability to be miniaturized negatively.

Therefore, it is necessary to provide an improved sound device to overcome the problems mentioned above.

SUMMARY OF THE INVENTION

The present disclosure provides a sound device with higher magnetic ability and miniaturization ability.

The sound device includes a frame with a receiving space; a magnet system received in the receiving space, including: a first central yoke; a central magnet mounted on the first central yoke located in a central position; a side yoke surrounding the central magnet to form a magnetic gap; and a connection portion connecting the first central yoke and the side yoke; a first vibration system arranged on one side of the magnet system, including: a first diaphragm fixed to the frame; and a first coil inserted in the magnetic gap and configured to drive the first diaphragm; a second vibration system arranged on the other side of the magnet system, including: a second diaphragm fixed to the frame; and a second coil inserted in the magnetic gap and configured to drive the second diaphragm; wherein the side yoke includes a first side yoke fixed to the frame and a second side yoke bending and extending from an edge of the first side yoke towards the central magnet; the connection portion connects the first central yoke and the second side yoke.

Further, the first side yoke extends along a vibration direction of the first diaphragm, the second side yoke extends along a direction perpendicular with the vibration direction; the first side yoke is perpendicular with the second side yoke.

Further, the first side yoke is fixed to a surface of the frame facing the central magnet.

Further, the second side yoke extends from an end of the first side yoke away from the first diaphragm.

Further, the magnetic gap comprises a first magnetic gap formed between the central magnet and the first side yoke, and a second magnetic gap formed between the central magnet and the second side yoke; the first coil is inserted in the first magnetic gap; the second coil is inserted in the second magnetic gap.

Further, the frame is in a rectangle shape; the connection portion connects an edge of the first central yoke along a short axis with an edge of the second side yoke along the short axis.

Further, the connection portion comprises a first connection part connecting with the first central yoke, a second connection part connecting with the second side yoke, and a third connection part connecting the first connection part with the second connection part; the first connection part is fixed to a surface of the first central yoke facing the central magnet; the second connection part is fixed to a surface of the second side yoke facing the first central yoke.

Further, the third connection part extends along the vibration direction.

Further, the central magnet comprises a first magnet portion fixed to the first central yoke and a second magnet portion fixed to a surface of the first magnet portion away from the first central yoke; a projection area of the first magnet portion along a vibration direction of the first diaphragm is larger than a projection area of the second magnet portion along the vibration direction.

Further, the magnet system further comprises a second central yoke fixed to a surface of the second magnet portion away from the first central yoke.

BRIEF DESCRIPTION OF THE DRAWINGS

The present disclosure will hereinafter be described in detail with reference to an exemplary embodiment. To make the technical problems to be solved, technical solutions and beneficial effects of present disclosure more apparent, the present disclosure is described in further detail together with the figures and the embodiment. It should be understood the specific embodiment described hereby is only to explain this disclosure, not intended to limit this disclosure.

DETAILED DESCRIPTION OF THE EXEMPLARY EMBODIMENT

The present disclosure will hereinafter be described in detail with reference to an exemplary embodiment. To make the technical problems to be solved, technical solutions and beneficial effects of the present disclosure more apparent, the present disclosure is described in further detail together with the figure and the embodiment. It should be understood the specific embodiment described hereby is only to explain the disclosure, not intended to limit the disclosure.

Figure 1:
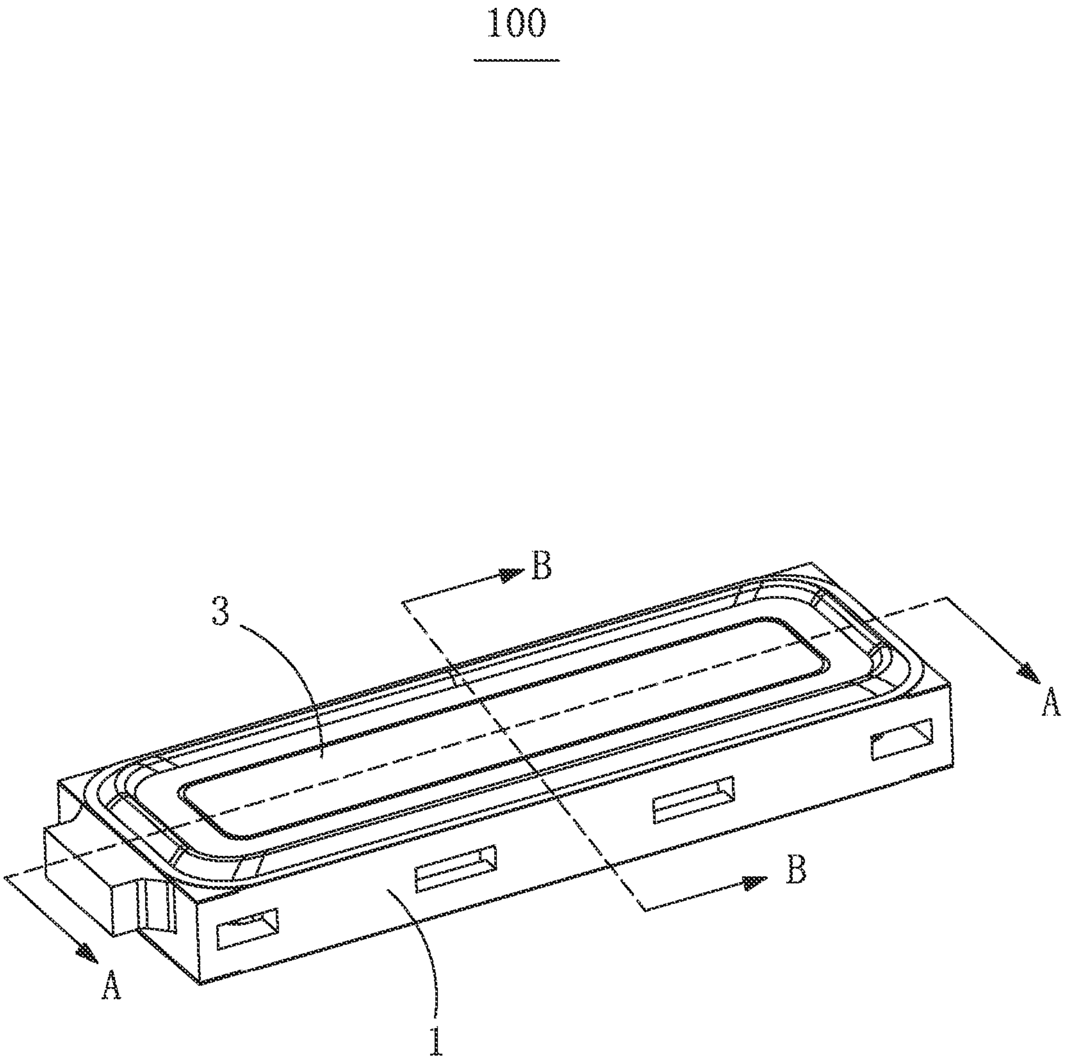
FIG. 1 is an isometric view of a sound device in accordance with an exemplary embodiment of the present disclosure.
Figure 2:
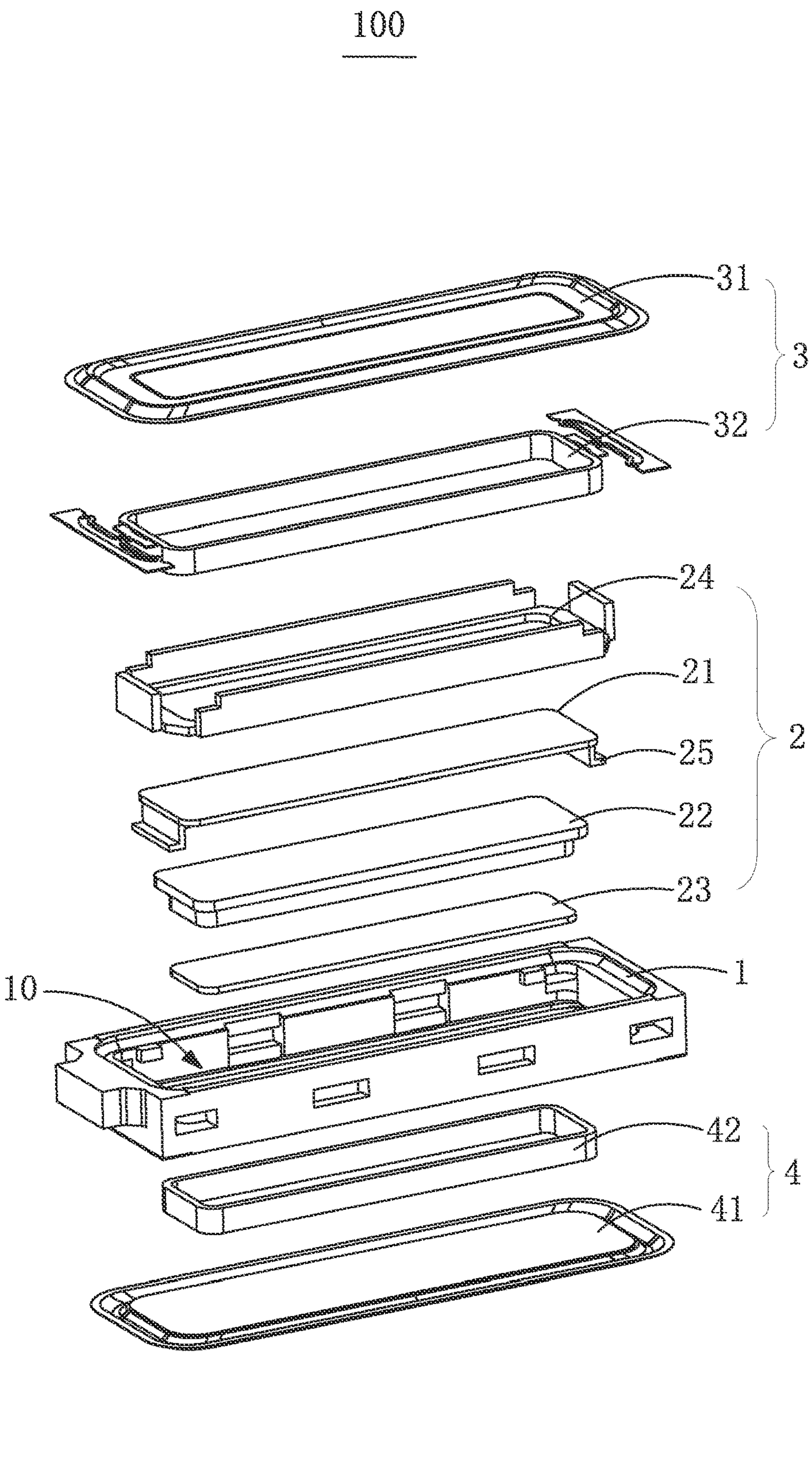
FIG. 2 is an exploded view of the sound device in FIG. 1.
Figure 3:
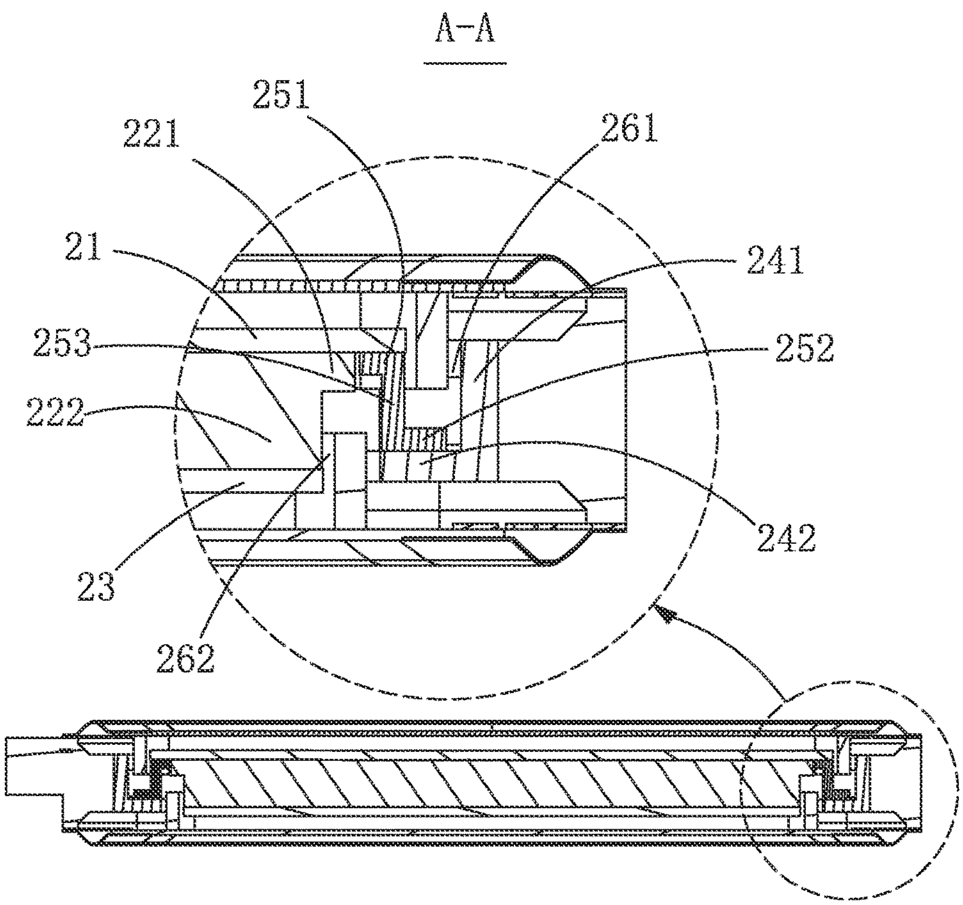
FIG. 3 is a cross-sectional view of the sound device taken along line A-A in FIG. 1.
Figure 4:
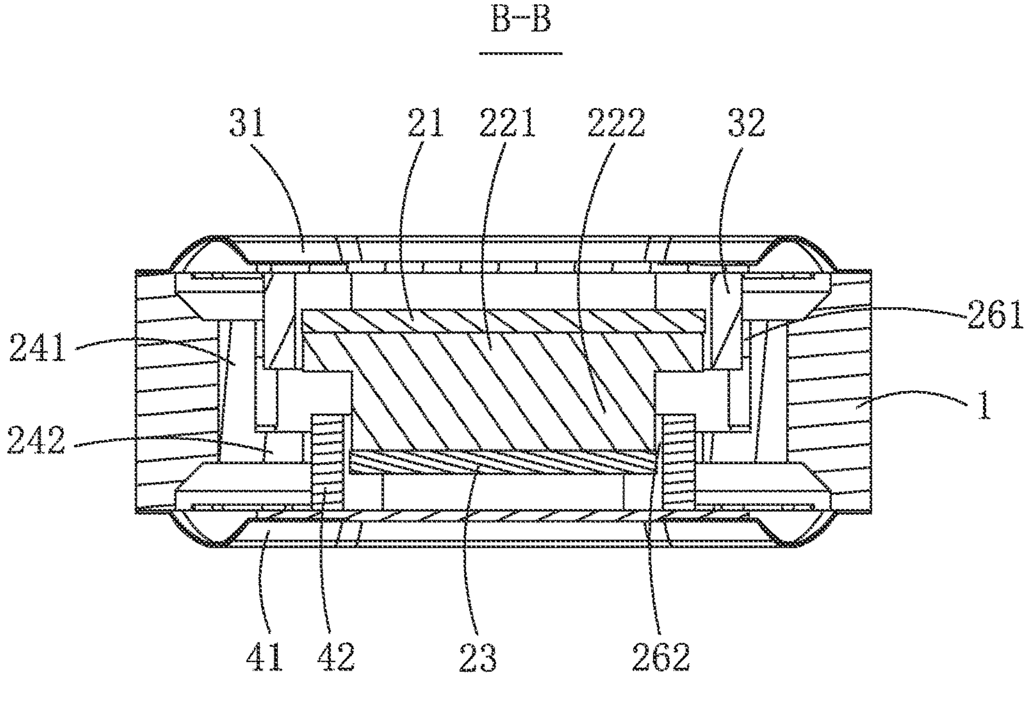
FIG. 4 is a cross-sectional view of the sound device taken along line B-B in FIG. 1.

Please refer to FIGS. 1-4 together, a sound device 100 provided by an exemplary embodiment of the present disclosure includes a frame 1 with a receiving space 10, a magnet system 2 received in the receiving space 10, a first vibration system 3, and a second vibration system 4. The first vibration system 3 and the second vibration system 4 are arranged on two opposite sides of the magnet system 2 and fixed to two opposite sides of the frame 1.

The magnet system 2 includes a first central yoke 21 located in a central position, a central magnet 22 mounted on the first central yoke 21, a second central yoke 23 fixed to a surface of the central magnet 22 away from the first central yoke 21, a side yoke 24 surrounding the central magnet 22 and fixed to the frame 1, and a connection portion 25 connecting the first central yoke 21 and the side yoke 24. The central magnet 22 is spaced apart from the side yoke 24 to form a magnetic gap 26.

The first vibration system 3 includes a first diaphragm 31 fixed to the frame 1 and a first coil 32 configured to drive the first diaphragm 31 to vibrate to generate sound; the first coil 32 is inserted in the magnetic gap 26.

The second vibration system 4 includes a second diaphragm 41 fixed to the frame 1 and a second coil 42 configured to drive the second diaphragm 41 to vibrate to generate sound; the second coil 42 is inserted in the magnetic gap 26.

Specifically, the central magnet 22 includes a first magnet portion 221 fixed to the first central yoke 21 and a second magnet portion 222 fixed to a surface of the first magnet portion 221 away from the first central yoke 21; a projection area of the first magnet portion 221 along a vibration direction of the first diaphragm 31 is larger than a projection area of the second magnet portion 222 along the vibration direction. It can be understood that the frame 1 is in a rectangle shape. A width of the first magnet portion 221 along a long axis is larger than a width of the second magnet portion 222 along the long axis. A width of the first magnet portion 221 along a short axis is larger than a width of the second magnet portion 222 along the short axis. Therefore, the magnetic gap 26 includes a first magnetic gap 261 formed between the first magnet portion 221 and the side yoke 24, and a second magnetic gap 262 formed between the second magnet portion 222 and the side yoke 24; the first coil 32 is inserted in the first magnetic gap 261; the second coil 42 is inserted in the second magnetic gap 262.

In one embodiment, the side yoke 24 includes a first side yoke 241 fixed to the frame 1 and a second side yoke 242 bending and extending from an edge of the first side yoke 241 towards the central magnet 22; the connection portion 25 connects the first central yoke 21 and the second side yoke 242. Specifically, the second side yoke 242 extends from an end of the first side yoke 241 away from the first diaphragm 31. Furthermore, because the frame 1 is in a rectangle shape, the sound device 100 is in a rectangle shape; the connection portion 25 connects an edge of the first central yoke 21 along a short axis with an edge of the second side yoke 242 along the short axis. Then, the first side yoke 241 extends along the vibration direction, the second side yoke 242 extends along a direction perpendicular with the vibration direction; the first side yoke 241 is perpendicular with the second side yoke 242.

Specifically, the connection portion 25 includes a first connection part 251 connecting with the first central yoke 21, a second connection part 252 connecting with the second side yoke 242, and a third connection part 253 connecting the first connection part 251 with the second connection part 252; the first connection part 251 is fixed to a surface of the first central yoke 21 facing the central magnet 22; the second connection part 252 is fixed to a surface of the second side yoke 242 facing the first central yoke 21. Moreover, the third connection part 253 extends along the vibration direction.

Compared with the related art, the sound device of the present disclosure includes a first vibration system and a second vibration system arranged on two opposite sides of a magnet system. The magnet system includes a first central yoke located in a central position, a central magnet mounted on the first central yoke, a side yoke surrounding the central magnet and fixed to the frame, and a connection portion connecting the first central yoke and the side yoke. The central magnet is spaced apart from the side yoke to form a magnetic gap. The side yoke includes a first side yoke fixed to the frame and a second side yoke bending and extending from an edge of the first side yoke towards the central magnet; the connection portion connects the first central yoke and the second side yoke. By providing the side yoke having the first side yoke and the second side yoke on the frame to form the magnetic gap with the central magnet, not only ensure high magnetic performance of magnet system, but also reduce the volume of the magnet system, thus effectively reducing the volume of the sound device to meet the miniaturization trend.

It is to be understood, however, that even though numerous characteristics and advantages of the present exemplary embodiments have been set forth in the foregoing description, together with details of the structures and functions of the embodiments, the disclosure is illustrative only, and changes may be made in detail, especially in matters of shape, size, and arrangement of parts within the principles of the invention to the full extent indicated by the broad general meaning of the terms where the appended claims are expressed.

What is claimed is:

1. A sound device comprising:

a frame with a receiving space;

a magnet system received in the receiving space, comprising:

a first central yoke located in a central position;

a central magnet mounted on the first central yoke;

a side yoke surrounding the central magnet to form a magnetic gap; and a connection portion connecting the first central yoke and the side yoke;

a first vibration system arranged on one side of the magnet system, comprising:

a first diaphragm fixed to the frame; and a first coil inserted in the magnetic gap and configured to drive the first diaphragm;

a second vibration system arranged on the other side of the magnet system, comprising:

a second diaphragm fixed to the frame; and a second coil inserted in the magnetic gap and configured to drive the second diaphragm; wherein the side yoke comprises a first side yoke fixed to the frame and a second side yoke bending and extending from an edge of the first side yoke towards the central magnet; the connection portion connects the first central yoke and the second side yoke.

2. The sound device as described in claim 1, wherein the first side yoke extends along a vibration direction of the first diaphragm, the second side yoke extends along a direction perpendicular with the vibration direction; the first side yoke is perpendicular with the second side yoke.

3. The sound device as described in claim 2, wherein the first side yoke is fixed to a surface of the frame facing the central magnet.

4. The sound device as described in claim 2, wherein the second side yoke extends from an end of the first side yoke away from the first diaphragm.

5. The sound device as described in claim 2, wherein the magnetic gap comprises a first magnetic gap formed between the central magnet and the first side yoke, and a second magnetic gap formed between the central magnet and the second side yoke; the first coil is inserted in the first magnetic gap; the second coil is inserted in the second magnetic gap.

6. The sound device as described in claim 5, wherein the frame is in a rectangle shape; the connection portion connects an edge of the first central yoke along a short axis with an edge of the second side yoke along the short axis.

7. The sound device as described in claim 6, wherein the connection portion comprises a first connection part connecting with the first central yoke, a second connection part connecting with the second side yoke, and a third connection part connecting the first connection part with the second connection part; the first connection part is fixed to a surface of the first central yoke facing the central magnet; the second connection part is fixed to a surface of the second side yoke facing the first central yoke.

8. The sound device as described in claim 7, wherein the third connection part extends along the vibration direction.

9. The sound device as described in claim 1, wherein the central magnet comprises a first magnet portion fixed to the first central yoke and a second magnet portion fixed to a surface of the first magnet portion away from the first central yoke; a projection area of the first magnet portion along a vibration direction of the first diaphragm is larger than a projection area of the second magnet portion along the vibration direction.

10. The sound device as described in claim 9, wherein the magnet system further comprises a second central yoke fixed to a surface of the second magnet portion away from the first central yoke.

* * * * *